United States Patent
Bock

(10) Patent No.: US 7,665,692 B2
(45) Date of Patent: Feb. 23, 2010

(54) BAGGAGE BIN DOOR AND BAGGAGE BIN

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 230 days.

(21) Appl. No.: 11/589,193

(22) Filed: Oct. 30, 2006

(65) Prior Publication Data

US 2007/0164154 A1 Jul. 19, 2007

Related U.S. Application Data

(60) Provisional application No. 60/749,628, filed on Dec. 13, 2005.

(30) Foreign Application Priority Data

Oct. 28, 2005 (FR) .................................. 05 11026

(51) Int. Cl.
*B64D 11/00* (2006.01)
(52) U.S. Cl. ................. 244/118.5; 244/118.1; 296/37.8; 105/325; 105/329.1; 105/344
(58) Field of Classification Search ............. 244/118.1, 244/118.5, 137.2; 312/319.1, 319.2, 325; 105/325, 329.1, 344; 296/37.8
See application file for complete search history.

(56) References Cited

U.S. PATENT DOCUMENTS

| | | | |
|---|---|---|---|
| 3,075,819 A * | 1/1963 | Liegeon et. al. | 312/271 |
| 4,383,347 A * | 5/1983 | La Conte | 16/360 |
| 5,056,878 A * | 10/1991 | Givens | 312/351.3 |
| 5,129,597 A * | 7/1992 | Manthey et al. | 244/118.5 |
| 5,395,074 A | 3/1995 | Hart et al. | |
| 5,422,794 A * | 6/1995 | Drake | 362/471 |
| 5,456,529 A | 10/1995 | Cheung | |
| 5,549,258 A * | 8/1996 | Hart et al. | 244/118.1 |
| 5,645,333 A * | 7/1997 | Sakurai | 312/322 |
| 5,687,929 A * | 11/1997 | Hart et al. | 244/118.1 |
| 5,868,353 A | 2/1999 | Benard | |

(Continued)

FOREIGN PATENT DOCUMENTS

AT 410536 5/2003

(Continued)

OTHER PUBLICATIONS

U.S. Appl. No. 11/589,248, filed Oct. 30, 2006, Bock.

(Continued)

*Primary Examiner*—Michael R Mansen
*Assistant Examiner*—Philip J Bonzell
(74) *Attorney, Agent, or Firm*—Oblon, Spivak, McClelland, Maier & Neustadt, L.L.P.

(57) ABSTRACT

A baggage bin for an aircraft includes a compartment with a lower face substantially plane and a first flap that, in a closing position, is inclined toward the inside of the baggage bin in relation to a plane perpendicular to the lower face of the baggage bin. The first flap is mounted pivoting around a first axis. The bin includes a second flap arranged outside the first flap in relation to the baggage bin and articulated with the first flap. The second flap extends, in the closing position of the baggage bin, from a lower edge of the baggage bin to a ceiling edge.

13 Claims, 3 Drawing Sheets

U.S. PATENT DOCUMENTS

| | | |
|---|---|---|
| 6,241,186 B1 | 6/2001 | Calnon |
| 6,290,175 B1 * | 9/2001 | Hart et al. ................. 244/118.5 |
| 6,296,337 B1 * | 10/2001 | Kawanabe ............... 312/319.2 |
| 6,398,163 B1 * | 6/2002 | Welch et al. ............. 244/118.1 |
| 6,471,312 B1 * | 10/2002 | Coffey et al. ................ 312/328 |
| 6,779,856 B2 * | 8/2004 | Hornberger et al. ......... 312/295 |
| 7,240,974 B2 * | 7/2007 | Hirtsiefer .................... 312/109 |
| 2001/0011692 A1 | 8/2001 | Sprenger et al. |
| 2002/0101090 A1 | 8/2002 | Steingrebe et al. |
| 2004/0245897 A1 | 12/2004 | Stephan et al. |
| 2005/0040287 A1 * | 2/2005 | Stephan et al. ........... 244/118.5 |
| 2005/0064174 A1 | 3/2005 | Gideon et al. |

FOREIGN PATENT DOCUMENTS

| | | |
|---|---|---|
| DE | 44 25 869 | 2/1996 |
| EP | 0 614 806 | 9/1994 |

OTHER PUBLICATIONS

U.S. Appl. No. 11/589,203, filed Oct. 30, 2006, Bock.
U.S. Appl. No. 12/374,756, filed Jan. 22, 2009, Bock.

* cited by examiner

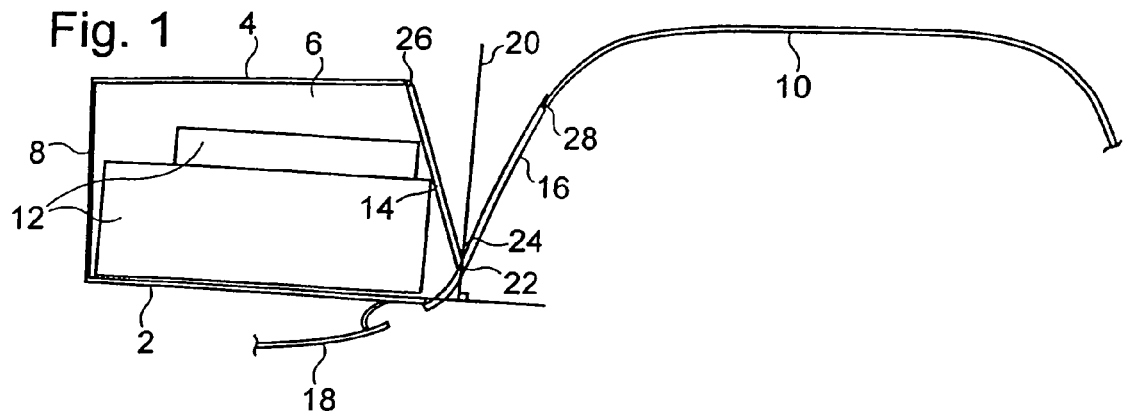
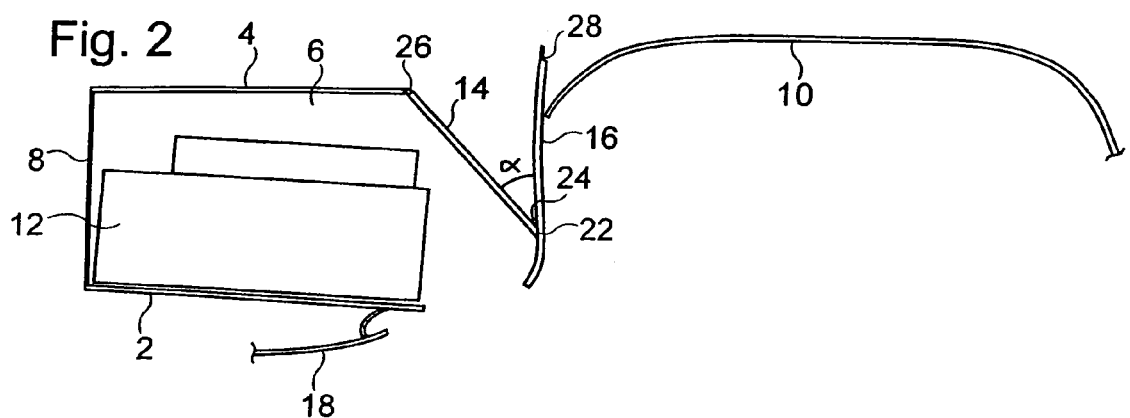
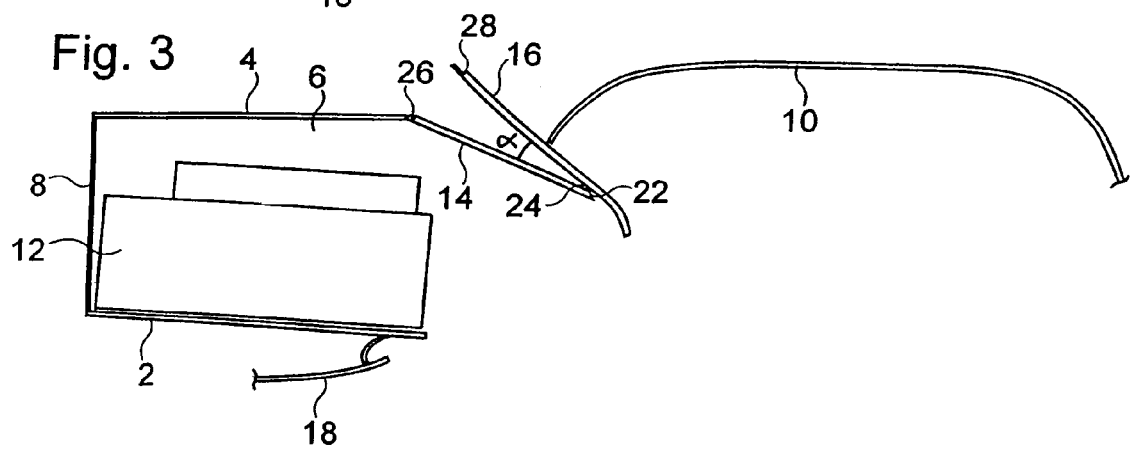
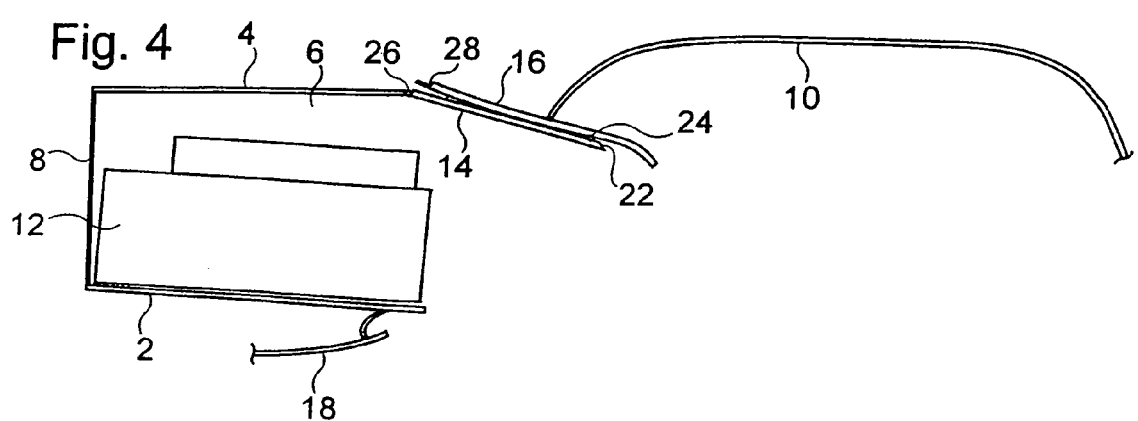

BAGGAGE BIN DOOR AND BAGGAGE BIN

CROSS-REFERENCE TO RELATED APPLICATIONS:

This document claims priority to French Application No. 05 11026, filed Oct. 28, 2005 and U.S. Provisional Application No. 60/749,628, filed Dec. 13, 2005, the entire contents of which are hereby incorporated by reference.

BACKGROUND OF THE INVENTION

1. Field of the Invention

This invention relates to a baggage bin door, in particular for a baggage bin in an aircraft, as well as a corresponding baggage bin.

2. Description of the Related Art

Generally, the cross section of a baggage bin in an aircraft has a more or less trapezoid shape, the large base of the trapezoid forming the lower face of the baggage bin. The lower portion of the baggage bin is longer in order to accommodate large pieces of baggage, while the upper portion is narrower in order to make it possible to secure a potential piece of baggage placed on top of another piece of baggage in the bin and to prevent its falling, in particular at the time of opening of the door of the baggage bin.

SUMMARY OF THE INVENTION

This trapezoid shape imposed by technical constraints is very restricting for defining the esthetics of the interior space of an aircraft cabin. As the baggage bins are situated just below the ceiling, the joining between the baggage bin and the ceiling forms an unsightly recess.

This invention then has as its purpose to provide a baggage bin door that makes it possible to give free rein for defining the form that the designers wish to impart to the interior space of the aircraft.

To this end, it proposes a baggage bin comprising a door allowing access to a compartment with a lower face having an area more or less plane in the vicinity of the door, the door having, in closing position, a first flap inclined toward the inside of the baggage bin in relation to a plane perpendicular to the more or less plane area of the lower face of the baggage bin, the said flap being mounted pivoting around a first axis.

According to this invention, the access door of the baggage bin furthermore comprises a second flap arranged outside the first flap in relation to the baggage bin and articulated with the first flap, and the second flap extends, in closing position of the baggage bin, from a lower edge of the baggage bin to a ceiling edge.

The first and second flaps of the above definition constitute, with other possible elements, a baggage bin door according to the invention. A baggage bin door of the prior art comprises only a single flap that generally also is referred to as a door or access door. The two flaps of the door of the baggage bin cooperate to close the baggage bin. One flap serves in particular to hold the piece(s) of baggage in the baggage bin, while the other flap takes on the desired shape for achieving the desired esthetic effect. With such a door having two flaps, any external appearance can be achieved, while ensuring a good retention of the baggage inside the baggage bin.

In a baggage bin according to the invention, the second flap, in a preferred embodiment, is articulated with the first flap so as to be able to pivot in relation to this first flap around a second axis of pivoting more or less parallel to the first. In another embodiment, the two flaps can be folded down one over the other in the opening position of the baggage bin and thus completely clear the opening of the baggage bin, facilitating access to the inside thereof.

In a variation of embodiment, the first flap closes the baggage bin only partially. This makes it possible in particular to incline the first flap more markedly in relation to the lower face of the baggage bin and thus be more effective for retention of the baggage in the bin.

In order to facilitate the handling of the door of the baggage bin, the latter advantageously also comprises means making it possible, at the time of opening thereof, to keep the second flap in contact with the said ceiling edge. The second flap then is, on the one hand, articulated with the first flap and on the other hand, guided over the edge of the ceiling. In this embodiment, the means making it possible to keep the second flap in contact with the edge of the ceiling comprise, for example, a spring acting so as to move the second flap away from the first flap. This spring advantageously is integrated into the articulation between the two flaps so as to limit its space requirement and better integrate it into the door.

In order to keep the flaps of the baggage bin according to the invention closed, locking means, for example, are arranged on the second flap.

This invention also relates to an aircraft cabin, characterized in that it comprises at least one baggage bin such as described above, as well as an aircraft comprising at least one such baggage bin.

BRIEF DESCRIPTION OF THE DRAWINGS

Details and advantages of this invention will emerge more clearly from the description that follows, presented with reference to the attached schematic drawing, on which:

FIG. 1 is a view in cross section of a baggage bin according to the invention in closed position.

FIGS. 2 and 3 are views corresponding to FIG. 1, the baggage bin being in an intermediate opening position, FIG. 4 is a view in cross section of a baggage bin according to the invention in completely open position.

DETAILED DESCRIPTION OF THE PREFERRED EMBODIMENTS

Figure 5:
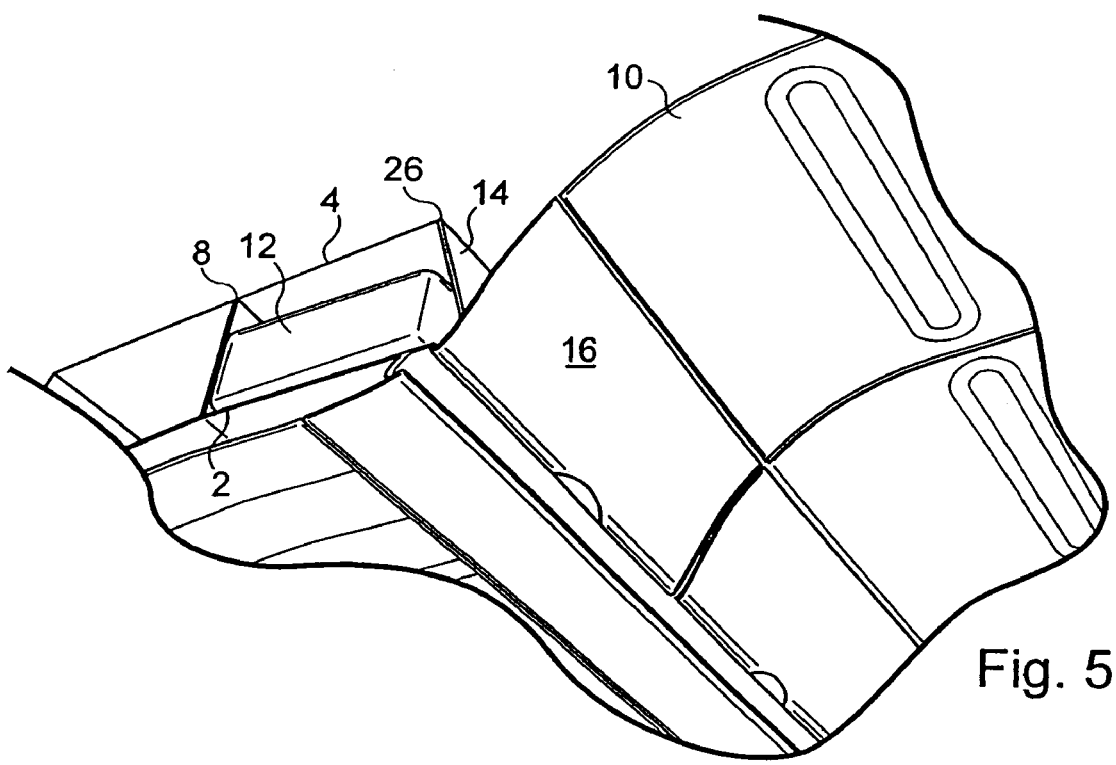
FIG. 5 is a perspective view of a baggage bin according to the invention in closed position.

A baggage bin according to the invention usually comprises a lower face 2, an upper face 4 and, between the lower face 2 and the upper face 4, two lateral walls 6 and a back wall 8. Access to the baggage bin is accomplished through the face opposite the back wall which is equipped with a door.

The baggage bin depicted in the drawings is in an aircraft cabin, above the seats (not depicted) located in this cabin, beneath the ceiling of the latter. A ceiling wall 10 is depicted on the Figures.

The lower face 2 of the baggage bin is intended to accommodate one (or more) piece(s) of baggage 12. In the embodiment depicted, the lower face 2 is a plane face. It is inclined slightly in relation to the horizontal so as to facilitate taking the baggage 12 out of the baggage bin.

The lateral walls 6, the back wall 8 and the upper face 4 define the volume of the baggage bin. These walls can be walls specific to the baggage bin, as depicted here. It also can be a matter of common walls with other elements such as, for example, another baggage bin. The back 8, for example, also can be the lateral wall of the aircraft cabin, in particular for baggage bins located above seats arranged near such a lateral wall. As for the upper face 4, it can be a part of the ceiling of the aircraft cabin.

The baggage bin depicted in the drawings is closed by a door having two flaps: a first flap 14 and a second flap 16.

The second flap 16 constitutes the visible portion of the door of the baggage bin for the user who is placing a piece of baggage 12 in the baggage bin or removing it therefrom. This second flap 16 connects the lower face 2 of the baggage bin to the ceiling wall 10 of the aircraft cabin. The shape of this second flap 16 can be adapted to the esthetics that one wishes to impart to the interior of the aircraft cabin. This flap thus preferably produces an esthetically harmonious connection between a streamlining 18 generally situated beneath a baggage bin—and usually integrating comfort elements such as lighting, air vents, etc.—and the ceiling wall 10.

The first flap 14 is arranged between the second flap 16 and the storage volume of the baggage bin. This first flap 14 is visible only when the baggage bin is open. It is intended in particular to hold the baggage 12 in its place in order to prevent the baggage 12 from falling out of the baggage bin, in particular at the time of opening of the door, by holding the baggage 12 inside the bin. This first flap 14 also is useful in the case where, as depicted on FIGS. 1 to 4, a small piece of baggage 12 is on top of another piece of baggage 12. It is clearly apparent (FIG. 1) that in the absence of the first flap 14, the small upper piece of baggage 12 might well slide as far as the second flap 16 and topple over. On opening of the door, the passenger then would be hit by his baggage 12. The first flap 14 makes it possible to effectively prevent such a fall.

The first flap 14 is of a more or less plane overall shape. It is inclined in relation to the lower face 2 of the baggage bin toward the inside of the bin, when the baggage bin is in closed position. Thus, the angle formed by the plane containing the lower face 2 and the plane containing the first flap 14 is less than 90°. For example, in the case where the first flap 14 is not plane, it can be provided that this first flap 14 is placed, in the closing position of the door of the baggage bin, inside a dihedron formed, on the one hand by the lower face 2, and on the other hand by a plane 20 perpendicular to the lower face 2 and passing through the lower edge 22 of the first flap 14 (cf. FIG. 1).

The first and second flaps 14 and 16 are articulated with respect to one another at the lower edge 22 of the first flap 14. This articulation can be implemented, for example, by a hinge connecting the two flaps. It allows the pivoting of one flap in relation to the other around a more or less horizontal first axis 24.

The first flap 14 also is articulated around a second axis 26, parallel to the first axis 24. This second axis 26, also horizontal, as depicted in the drawings, corresponds, for example to the upper edge of the first flap 14. The articulation can be implemented at the upper face 4 of the baggage bin. In the example depicted, this articulation is effected more specifically at the free end of the upper face 4 of the baggage bin. This articulation could, in another embodiment, be implemented at the ceiling of the aircraft cabin.

In the position depicted on FIG. 1, corresponding to the closed position of the door of the baggage bin, the two flaps 14 and 16 form more or less a dihedron in relation to the first axis 24. One of the flaps is arranged essentially on one side of the plane 20 perpendicular to the lower face 2 of the baggage bin, while the other flap is arranged essentially on the other side of this perpendicular plane 20.

The first flap 14 does not necessarily extend over the entire height of the baggage bin in the closing position of the latter, as is the case for the preferred embodiment depicted in the drawings. A space can be left between the edge 22 of the first flap 14 and the lower face 2 of the baggage bin. This space then is closed by the lower portion of the second flap 16. This embodiment makes it possible to incline the first flap toward the inside of the baggage bin without excessively encroaching on the interior volume of this bin. In such a case, a locking mechanism (not depicted) making it possible to keep the door in its closed position, is provided on the lower portion of the second flap 16. Such a locking mechanism is known to the individual skilled in the trade and is not described here.

In order to implement the connection between the second flap 16 and the ceiling wall 10, the upper edge of the second flap 16 comprises a rabbet 28, visible in particular on FIGS. 2 to 4, accommodating, in closing position of the door of the baggage bin, the edge of the ceiling wall 10 positioned toward the baggage bin.

FIGS. 1 to 4, 4 to 1 respectively, illustrate the opening and closing, respectively, of the door described above.

As already mentioned, FIG. 1 depicts the door in its closing position. The baggage 12 rests on the lower face 2. The second flap 16 on the one hand comes to rest at its upper edge and its rabbet 28 on the corresponding edge of the ceiling wall 10, and the other hand its lower edge is held by the locking mechanism in the immediate vicinity of the free edge of the lower face 2 of the baggage bin. As for the first flap 14, it is held between its two articulations, one connecting it to the second flap 16 and the other to the free edge of the upper face of the baggage bin.

In order to open the baggage bin, the locking mechanism is activated by releasing the second flap 16. A dual movement then is produced.

According to a first movement, the first flap 14 and the second flap 16 pivot in relation to one another around the first axis 24, reducing (at the time of opening of the door) the angle a formed between the two flaps. According to a second movement, the first flap 14 pivots around the free edge of the upper face 4, that is, around the second axis 26.

These two movements are simultaneous. In the course thereof, the outer face, that is, the visible face, of the second flap 16 remains in contact with the free edge of the ceiling wall 10, which free edge becomes situated in the rabbet 28 in closed position of the door of the baggage bin.

In order to maintain the contact between the second flap 16 and the edge of the ceiling wall 10, elastic means are provided between the two flaps to keep them apart from one another. Such means are not depicted in the drawings. They can be integrated, for example, at the first axis of articulation 24. Different means also can be provided. Other means also can be considered to maintain the contact between the second flap 16 and the ceiling wall. Thus, for example, guidance means can be provided on the edge of the ceiling wall 10, the second flap 16 being equipped with complementary means.

At the time of opening of the door, as illustrated on the Figures, the second flap 16 folds over the first flap 14. The opening movement of the door is stopped when the two flaps are one against the other and come to butt against the edge of the ceiling wall 10. The opening then is maximal. As the two flaps are one against the other, the opening thus is as large as if there were only one flap (and therefore a standard door of the prior art).

The closing of the door of the baggage bin is implemented in reverse manner from the opening described above and is easily deduced therefrom.

Figure 6:
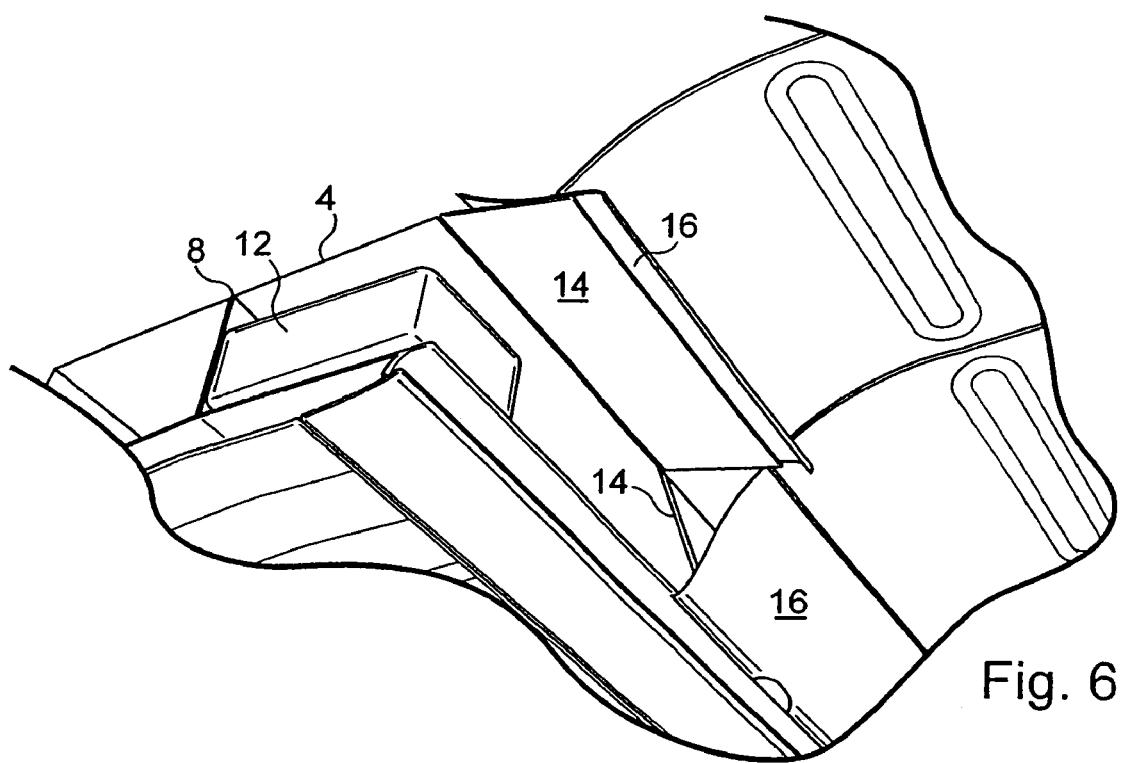
FIG. 6 is a perspective view of a baggage bin according to the invention in open position.
Figure 7:
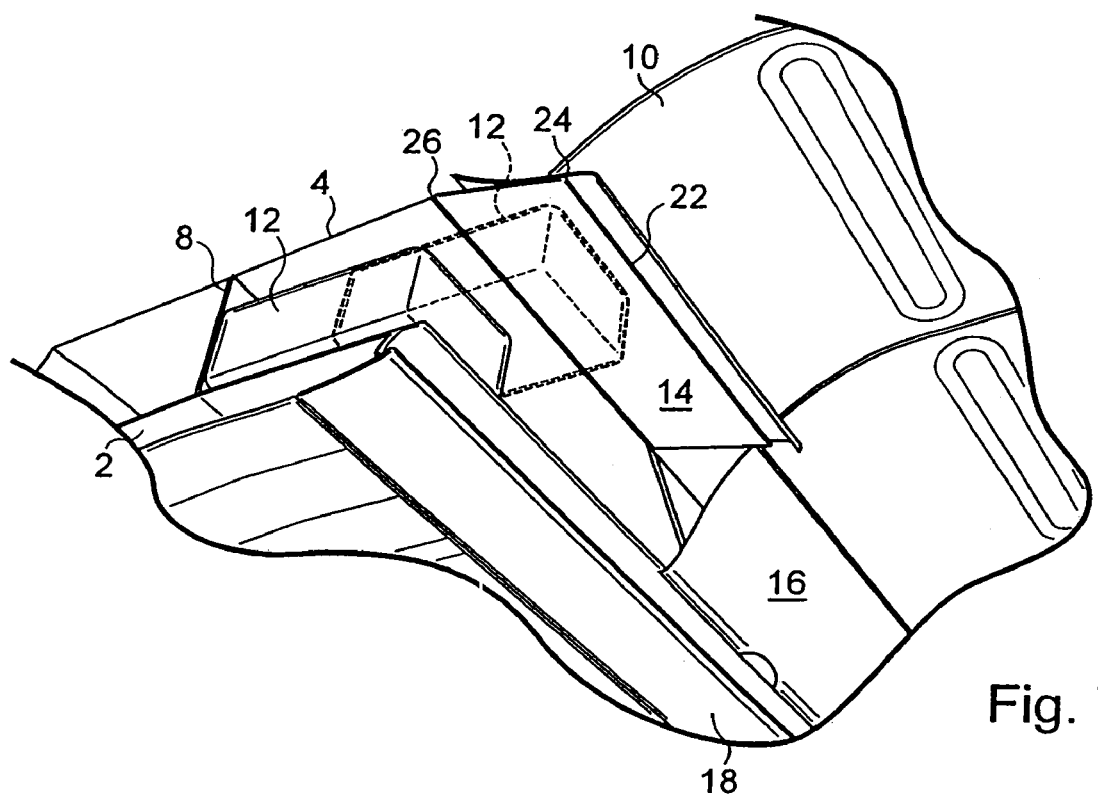
FIGS. 7 and 8 illustrate, in perspective, the placement of baggage in the baggage bin of FIGS. 5 and 6.
Figure 8:
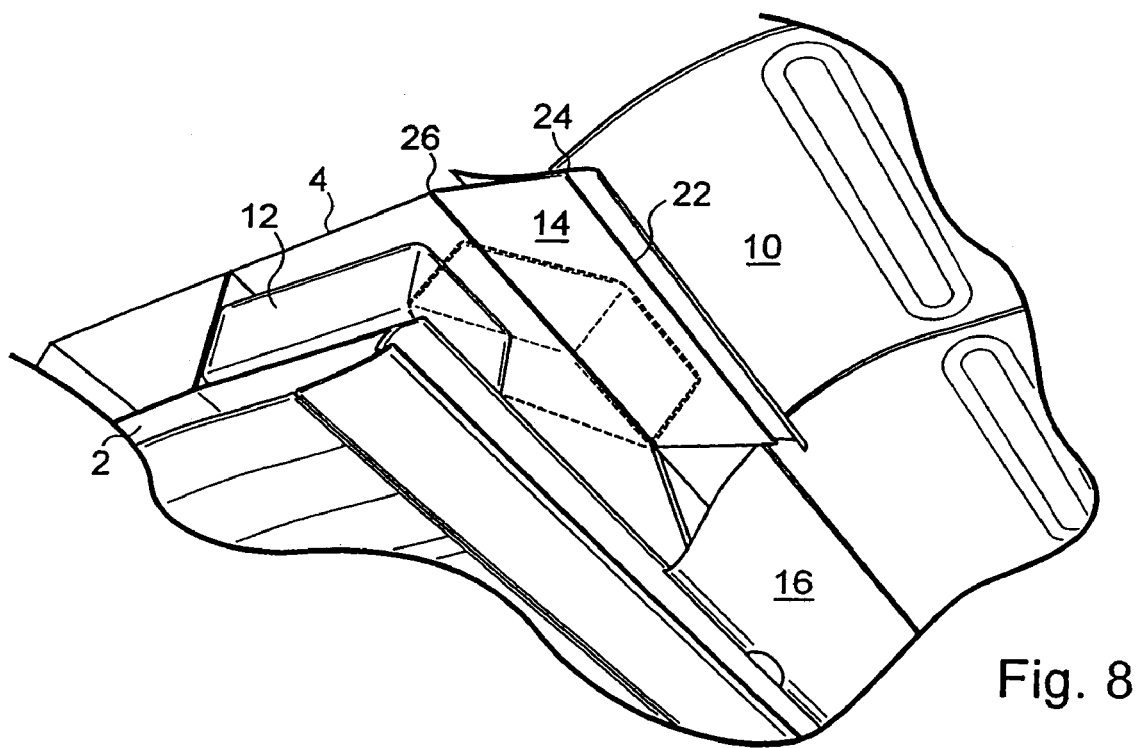

FIGS. 5 to 8 show the baggage bin of FIGS. 1 to 4 in perspective. It is noted on these Figures that, on the one hand the second flap 16, the only visible portion of the door of the baggage bin in the closed position of the latter, makes it possible to conceal the baggage bin esthetically and, on the other hand, the door according to the invention in no way hampers the removal (or the placement) of a piece of baggage in the baggage bin. In the closed position of the door, the first flap 14, not visible from the outside, holds the baggage 12 in the baggage bin. The first flap 14 also is effective when two pieces of baggage, of smaller size than the one depicted, are placed one on top of the other. The first flap 14 then limits the sliding of the baggage located on top in the direction of the door of the baggage bin.

When the door described above is in its open position, it comes to be retracted toward the ceiling, thus clearing the opening for handling the baggage intended to be positioned in the corresponding baggage bin.

This invention is not limited to the preferred embodiment described above and to the variations cited. It also relates to all the variations of embodiment within the reach of the individual skilled in the trade, in the context of the claims below.

What is claimed as new and desired to be secured by letters patent of the United States is:

1. A baggage bin, comprising:
   a compartment having an opening; and
   a door to cover the opening and to allow access to said compartment via the opening;
   wherein said compartment has a lower face having a planar area near the door,
   wherein the door has, in a closed position, a first flap inclined toward an inside of the compartment in relation to a plane perpendicular to the planar area of the lower face of the compartment, said first flap being mounted pivoting around a first axis at an upper edge of the compartment that defines a top of the opening,
   wherein the door comprises a second flap arranged, in the closed position, outside the first flap in relation to the compartment such that the first flap and the second flap overlap in a lateral direction, and the second flap is articulated with the first flap,
   wherein the second flap is connected to the first flap at a lower portion of the second flap and the lower portion of the second flap contacts a lower edge of the compartment in the closed position, and
   wherein the second flap extends, in said closed position, from the lower edge of the compartment in a direction angled away from the inside of the compartment in relation to the plane perpendicular to the planar area of the lower face of the compartment.

2. The baggage bin according to claim 1, wherein the second flap is articulated with the first flap so as to be able to pivot in relation to said first flap around a second axis of pivoting that is parallel to the first axis.

3. The baggage bin according to claim 1, wherein the first flap only partially closes the opening of the compartment.

4. An aircraft cabin comprising at least one baggage bin according claim 1.

5. An aircraft comprising at least one baggage bin according to claim 1.

6. The baggage bin according to claim 1, wherein the first flap is connected to the second flap at a bottom edge of the first flap.

7. The baggage bin according to claim 1, wherein an entirety of the first flap pivots around the first axis.

8. The baggage bin according to claim 1, wherein, in the closed position, an angle between the second flap and the lower face of the compartment is greater than 90°.

9. The baggage bin according to claim 1, wherein, as the door moves from the closed position to an open position, an angle between the first flap and the second flap decreases.

10. The baggage bin according to claim 1, wherein, as the door moves from the closed position to an open position, the second flap remains in contact with a ceiling edge.

11. The baggage bin according to claim 1, wherein the second flap includes a rabbet at an end of the second flap to contact a ceiling edge in the closed position.

12. The baggage bin according to claim 1, wherein an overall shape of the first flap is planar.

13. The baggage bin according to claim 12, wherein, in the closed position, an angle between the planar first flap and the lower face of the compartment is less than 90°.

* * * * *